US012105477B2

(12) United States Patent
Cretenet et al.

(10) Patent No.: US 12,105,477 B2
(45) Date of Patent: Oct. 1, 2024

(54) HOROLOGICAL SETTING MACHINE AND SETTING METHOD

(71) Applicant: Nivarox-FAR S.A., Le Locle (CH)

(72) Inventors: Davy Cretenet, La Chaux-de-Gilley (FR); Philippe Barthoulot, Maiche (FR); Joseph Balossi, Villers-le-Lac (FR)

(73) Assignee: NIVAROX-FAR S.A., Le Locle (CH)

( * ) Notice: Subject to any disclaimer, the term of this patent is extended or adjusted under 35 U.S.C. 154(b) by 940 days.

(21) Appl. No.: 17/143,391

(22) Filed: Jan. 7, 2021

(65) Prior Publication Data

US 2021/0302913 A1 Sep. 30, 2021

(30) Foreign Application Priority Data

Mar. 27, 2020 (EP) .................................... 20166287

(51) Int. Cl.
*G04B 18/02* (2006.01)
*G04B 1/22* (2006.01)
(Continued)

(52) U.S. Cl.
CPC ............. *G04B 18/026* (2013.01); *G04B 1/22* (2013.01); *G04B 17/20* (2013.01); *G04D 1/0021* (2013.01); *G04D 7/00* (2013.01)

(58) Field of Classification Search
CPC ........ G04D 7/004; G04D 7/00; G04D 7/1271; G04D 1/0021; G04D 1/0078; G04D 1/06; G04B 1/22; G04B 17/20
See application file for complete search history.

(56) References Cited

U.S. PATENT DOCUMENTS 5,988,871 A * 11/1999 Bonnet .................. G04B 3/006 81/7.5
9,292,000 B2 * 3/2016 Lamarche ................ G04B 5/00
(Continued)

FOREIGN PATENT DOCUMENTS

EP 3 422 119 A2 1/2019
EP 3 572 887 A1 11/2019

OTHER PUBLICATIONS

Thierry Conus, "Swatch SISTEM51", Sep. 16, 2015, XP055733993, pp. 105-111.
European Search Report for EP 20 16 6287 dated Sep. 25, 2020.

*Primary Examiner* — Seahee Hong
(74) *Attorney, Agent, or Firm* — Sughrue Mion, PLLC

(57) ABSTRACT

A setting machine (1000) for making a setting and/or adjustment on an assembly (1) attached to a receptacle (10), including a positioning module (100) to move this receptacle (10) on command from control means (3000) to convey it into a setting and/or adjustment position below an acquisition module (200), which includes measuring and/or testing means for determining the spatial position of the receptacle (10), and including a setting and/or adjustment module (400) for making a setting and/or an adjustment with motorised axes for moving, opening and closing, in a clamp plane perpendicular to a clamp rotation direction (DF, DG), a clamp (600) arranged to drive or deform a mobile component or a component included in such an assembly (1) borne by a receptacle (10), and method for using such a setting machine for setting and/or adjusting at least one horological component.

22 Claims, 11 Drawing Sheets

(51) Int. Cl.

| | |
|---|---|
| ***G04B 17/20*** | (2006.01) |
| ***G04D 1/00*** | (2006.01) |
| ***G04D 7/00*** | (2006.01) |

(56) References Cited

U.S. PATENT DOCUMENTS

| | | | | |
|---|---|---|---|---|
| 2020/0166891 | A1* | 5/2020 | Hinaux | G04D 7/1278 |
| 2020/0168894 | A1* | 5/2020 | Jang | H01M 4/502 |

* cited by examiner

HOROLOGICAL SETTING MACHINE AND SETTING METHOD

CROSS-REFERENCE TO RELATED APPLICATIONS

This application claims priority to European Patent Application No. 20166287.1 filed Mar. 27, 2021, the entire contents of which are incorporated herein by reference.

FIELD OF THE INVENTION

The invention relates to a horological setting machine for making at least one setting and/or adjustment on at least one horological assembly attached to a receptacle, said setting machine including control means, for coordinating in an automated manner the movements and/or operation of at least one positioning module, which includes handling means arranged to spatially move a said receptacle on command from said control means to convey it into a setting and/or adjustment position relative to a frame included in said setting machine, under at least one acquisition module, which includes measuring and/or testing means arranged to identify and determine the spatial position of a said receptacle, and/or a said at least one horological assembly attached to a said receptacle, relative to said frame and to communicate to said control means the information for the control or/and correction of position of said positioning module.

The invention further relates to a method for using such a setting machine for setting and/or adjusting at least one horological component.

The invention relates to the field of timepiece setting mechanisms.

BACKGROUND OF THE INVENTION

In watchmaking, some fine settings, particularly the frequency setting of an oscillator, or the rate setting of a watch, are operations subject to little automation, entrusted to highly qualified staff, and which often require several successive basic settings.

Obtaining a high chronometric quality is, thus, a costly operation.

The article “Swatch SISTEM 51” by Thierry CONUS, dated 16 Sep. 2015, published on the Internet XP055733993, describes a watch rate setting by means of a laser ablation method on a machine for making a setting or adjustment on a resonator component.

The documents EP3572887A1 and EP3422119A2 held by THE SWATCH GROUP RESEARCH & DEVELOPMENT Ltd each describe a setting machine for performing time-setting, and a rotary actuation module, for successively bringing each watch borne by the machine opposite a viewing system or a microphone.

SUMMARY OF THE INVENTION

The invention proposes to automate fine settings on horological movements, or on watch heads or “WH”, which are completed assemblies, and to carry out this automation at a compact workstation, which can for example be set up on a watchmaker’s bench.

The means used are envisaged to ensure the cleanliness of this workstation, which is important due to the handling of completed watch heads or completed movements.

This installation should guarantee the expected performances in terms of setting sensitivity, precision, digitisation, flexibility and reproducibility. The digitisation thereof should help guarantee short cycle times, and attaining high precisions, with a workstation that is ergonomic and easy to use.

While numerous applications of the invention are possible in the field of watchmaking, the invention is particularly well-suited for the fine setting of an oscillator, particularly by actuating setting screws, directly in the movement or watch head.

The aim is reliable setting during a single operation.

For this purpose, the invention relates to a setting machine according to claim 1.

The invention further relates to a setting and/or adjustment method, using such a setting machine, according to claim 18.

BRIEF DESCRIPTION OF THE DRAWINGS

Further features and advantages of the present invention will emerge on reading the following detailed description, with reference to the appended figures, wherein:

- in FIG. 8, the preparation of the support in FIG. 6 to receive a watch head, with two clamps or locking wedges which are forks arranged to bear on horns of the watch head;
- in FIG. 9, the deposition of the watch head on a spring mechanism and bearing on a bearing surface in an angular position where the horns are outside the arms of the forks;
- in FIG. 10, the attachment of the watch head on the receptacle thereof, after one the rotation of the watch head to an angular stop bearing position of one of the horns on a pin;

DETAILED DESCRIPTION OF PREFERRED EMBODIMENTS

The invention relates to a horological setting machine 1000, which is designed to make at least one setting and/or adjustment on at least one horological assembly 1 attached to a receptacle 10.

This setting machine 1000 includes control means 3000, for coordinating in an automated manner the movements and/or operation of at least one module, in particular at least one positioning module 100.

The invention will be described more specifically for the use of this setting machine 1000 for setting a mechanical watch oscillator, of the sprung-balance type, by actuating setting screws conventionally included in the balance of this oscillator. These setting screws are generally differential-step, to compensate for the play; thus they remain in position once set. This application is no way restrictive.

Figure 1:
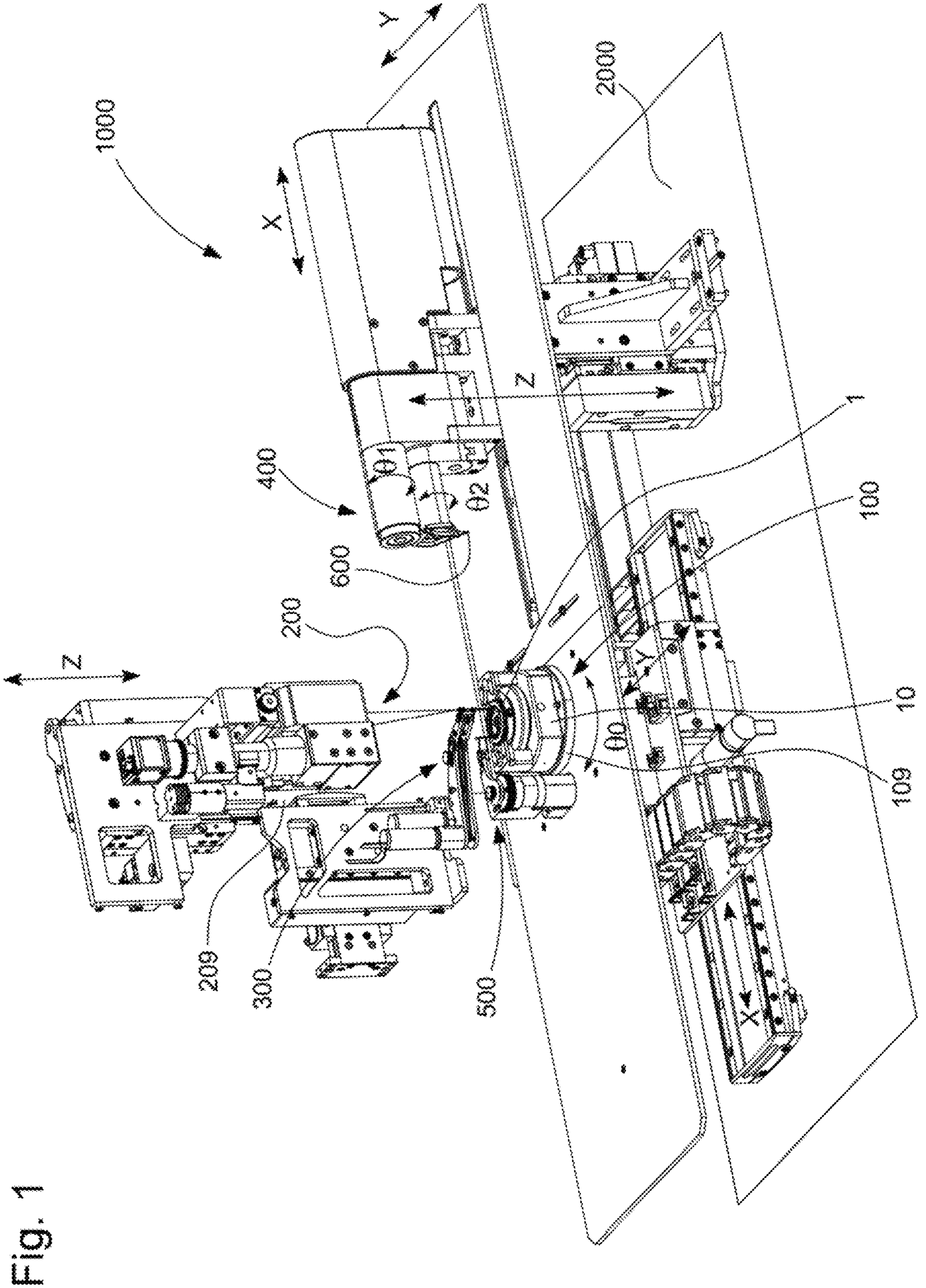
FIG. 1 represents, schematically, in a perspective view, without the casing thereof, a setting machine according to the invention, which includes, on a frame, various modules which are represented independently of one another in the following figures, and wherein a positioning module is attached directly to the frame and includes a carriage with cross movements bearing a table in turn bearing a receptacle of a horological assembly, and wherein an acquisition module can move relative to a vertical member not shown, in the form of an overhanging column, and includes viewing means and laser means for determining the position of the receptacle and the contents thereof; the frame directly bears a setting and/or adjustment module, which includes a clamp arranged to move a mobile component or a component of an assembly disposed on the receptacle; a drive module includes a driver arranged to drive this mobile component or component; a holding and/or support module includes a bearing finger arranged to bear on this mobile component or component.

The figures illustrate a specific, non-restrictive, embodiment, where the axes are defined conventionally by an orthogonal system: the Z axis is the vertical of the location, the X axis corresponds to a longitudinal direction, the Y axis corresponds to a transverse direction, as seen in FIG. 1 which represents a setting machine 1000 according to the invention, equipped with all the basic modules and all the setting modules described hereinafter.

This positioning module 100 includes handling means, which are arranged to move a receptacle 10 spatially, on command from the control means 3000, to convey it to a setting and/or adjustment position relative to a frame 2000 included in the setting machine 1000, and to convey it below at least one acquisition module 200, or below another module of the setting machine 1000, in particular a setting and/or adjustment module 400 which will be described below. This frame 2000 can be a base belonging to the setting machine 1000 which is then easy to move, or consist of a watchmaker's bench 4000, which is then integrated in the setting machine 1000.

The frame 2000 bears directly or indirectly at least one setting module, and the control means 3000 are arranged to coordinate in an automated manner the movements and/or the operation of each setting module, included in the setting machine 1000.

The setting machine 1000 preferably includes a casing 5000, encompassing all of the component modules thereof, and which can be placed under negative pressure or positive pressure to ensure the cleanliness of the equipment. This casing 5000 particularly bears the control means 3000, conventionally included in a user interface 3001 such as a screen/keyboard or similar, and a link with a production management system and/or a quality management system. More specifically, the user interface 3001 can be used for the high-magnification visualisation of the work zone during the intervention of the various modules, when the setting machine 1000 includes an optical module 700 equipped with a digital microscope or similar, which facilitates the settings and validations.

The study shows that the work steps and movements in an assisted manual version require at least 29 functional steps, 37 movements, and 9 axes. The choice of a fully digital machine makes it possible to ensure perfect control of the process, with reproducible operations, and readily configurable settings; in addition, a digital version is solely able to reduce the cycle time; in the non-restrictive alternative embodiment illustrated by the figures, these control means 3000 control 13 digital axes, which makes it possible to reduce the number of functional steps and movements.

Naturally, the number and arrangement of the axes are dependent on the configuration selected for the machine, which includes herein an overhanging column that can be moved along Z; however, the mobility along Z could also be at the level of the positioning module 100. The vertical movements can also be associated with a gantry instead of a column. The advantage of the overhanging column is that of freeing up the space in front of the column relatively largely, for the various drivers and grippers, and to facilitate vision or passage of laser beams.

More specifically, the positioning module 100 can move relative to the frame 2000 at least along the longitudinal direction X. The movement of a table 109 bearing a receptacle 10 along the longitudinal direction X is carried out in at least three remarkable positions: rest position, laser measurement position, setting screw correction position. This positioning module 100 advantageously includes a rotary axis Θ0 for rotating the table 109. In an alternative embodiment as illustrated, this positioning module 100 can move relative to the frame 2000 both along the longitudinal direction X and along the transverse direction Y, which makes it possible to go beyond the eccentric travel permitted by the rotary axis Θ0.

The acquisition module 200 includes measuring and/or testing means, which are arranged to identify and determine the spatial position of a receptacle 10, and/or of an at least one horological assembly 1 attached to a receptacle 10, relative to the frame 2000, and to communicate to the control means 3000 the information for the control and/or correction of position of the positioning module 100.

The acquisition module 200 particularly includes a carriage 209 that can move along the vertical direction Z. This carriage 209 bears viewing means and a laser beam oriented herein along the vertical direction Z. This module is designed for the automatic adjustment of the viewing and laser focal positions, relative to the various assemblies 1, movements or watch heads, borne by a receptacle 10. This focal adjustment of the viewing system and the laser measuring system is performed according to a setting cycle which includes: balance centring position, cleared zones position, laser measurement position along Z, setting screw orientation position.

This acquisition module 200 can further bear a secondary carriage, that can also move along the vertical direction Z and borne by the carriage 209, to separate, for some specific applications, the movements of the viewing system and the laser system. In a specific alternative embodiment not illustrated, this acquisition module 200 can include another laser source, not attributed to measurement, but to ablation operations on the balance and on the balance-spring.

In the application of the setting machine 1000 to the setting of a sprung-balance oscillator, the acquisition module 200 serves essentially to detect the centre of the balance to ensure the reliability of the setting screw correction process, to ensure the correct centring of a setting clamp 600, disclosed hereinafter, on the balance setting screw axis.

According to the invention, the setting machine 1000 includes at least one setting module which is a setting and/or adjustment mechanism 400. This setting and/or adjustment mechanism includes a setting and/or adjustment module 400, which includes setting and/or adjustment means, which are arranged to make a setting and/or an adjustment on at least one assembly 1 borne by a receptacle 10, and/or on at least one component or a mobile component included in an assembly 1, on command from the control means 3000.

More specifically, this setting and/or adjustment means 400 is an angular correction module, the setting and/or adjustment means whereof include a plurality of motorised axes which are arranged to move, open and close in a clamp plane, preferably but not restrictively in a vertical plane through the vertical of the location, this clamp plane being perpendicular to a clamp rotation direction DF, DG, a clamp 600, which is arranged to actuate or deform a mobile component or a component including an assembly 1 borne by a receptacle 10.

More specifically, this clamp 600 is arranged to enable the gripping/loosening of any type of screw head profile: "Torx®", hexagonal, slotted, headless, "Imbus", conical, with shoulder, or other.

More specifically, the setting and/or adjustment module 400 can move relative to the frame 2000 of the setting machine 1000 at least along the vertical direction Z.

Figure 2:
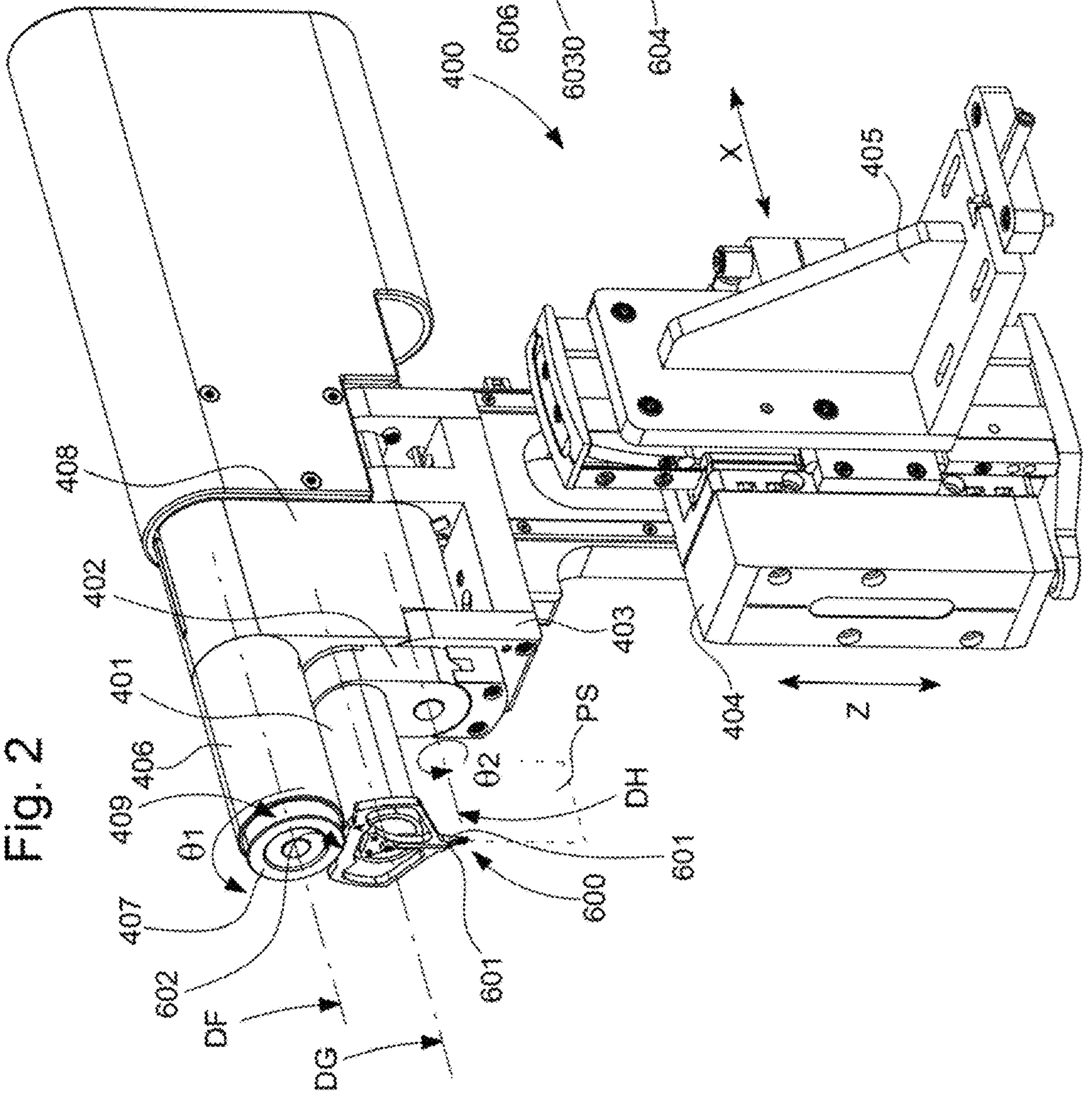
FIG. 2 represents, similarly to FIG. 1, a setting and/or adjustment module, arranged to make a setting and/or an adjustment on a mobile component or a component of an assembly borne by a receptacle disposed on the table of the positioning module, this setting and/or adjustment module includes a clamp, here a monolithic clamp, the opening and closure whereof are motorised, and which can be moved in rotation and/or in translation.

More specifically, in the non-restrictive arrangement illustrated in particular by FIG. 2, the setting and/or adjustment module 400 includes a clamp-holder body 401, which is arranged to bear a clamp 600, and which can rotate about a clamp rotation axis DH, parallel with the clamp rotation direction DF, DG, along a rotary clamp setting axis Θ2, relative to a clamp carriage 403. This clamp carriage 403 can move along a vertical direction Z parallel with the vertical of the location relative to a structure 404 which is, either attached to the frame 2000, or free to move along a horizontal direction X perpendicular to the vertical of the location, or along a vertical direction Z parallel with the vertical of the location, relative to a clamp base 405 attached to the frame 2000.

Specifically and advantageously, the clamp 600 is monolithic, in an elastic material. More specifically, the clamp 600 is made of silicon and/or silicon oxide, spring steel, or similar. Indeed, in the preferred applications thereof, the clamp 600 is very small in size, the volume thereof is similar to that of a movement, and this constraint is hardly compatible with an articulated mechanism for operation without play, and with a repetitive value of low-intensity pressure forces to protect the components in question.

More specifically, this setting and/or adjustment module 400 includes a clamp control body 406 including a spindle 407, particularly a spindle 407 forming a cam, which is arranged to exert a force on a surface of the clamp 600 and deform the clamp in an opening or closing movement. This clamp control body 406 is particularly free to move in rotation, along a rotary clamp opening/closing control axis Θ1, either about a clamp rotation axis DH, or about a spindle axis DF parallel with a clamp rotation axis DH, relative to a clamp carriage 403 which can move along a vertical direction Z parallel with the vertical of the location relative to a structure 404 which is, either attached to the frame 2000, or free to move along a horizontal direction X perpendicular to the vertical of the location relative to a clamp base 405 attached to the frame 2000.

More specifically, the clamp control body 406 is arranged to move the spindle 407 over 360° for the opening or closing control of the clamp 600. More specifically, the clamp control body 406 can rotate about the clamp rotation axis DH, so as to be able to exert, in certain angular positions, offset pressure relative to a plane of symmetry PS of the clamp 600.

The clamp 600 includes clamp arms 601 for handling a component or mobile component of the assembly 1, particularly a balance setting screw. In the non-restrictive method of use illustrated by the figures, each clamp arm 601 can move in a clamp plane, particularly a vertical plane through the vertical of the location, the clamp plane being perpendicular to a clamp rotation axis DH or to a spindle axis DF parallel with a clamp rotation axis DH. Obviously, for other applications, the common plane of the clamp arms 601 can be moved spatially.

The clamp arms 601 are designed to grip the outer diameter of the setting screws of all balance types, even the smallest.

More specifically, the clamp 600 is elastic, and includes at least one bearing portion 602 which is subject to the action of an actuator or a spindle 407 or an eccentric and/or a push-piece, included in the setting and/or adjustment module 400, and wherein any deformation of this at least one bearing portion 602 modifies the relative mutual position of the arms 601, and deforms the clamp 600, which makes it possible to use the clamp 600 as a tool for making a setting.

More specifically, the clamp 600 is symmetrical relative to a plane of symmetry PS, and includes first elastic arms 607 and/or second elastic arms 604.

Figure 3:
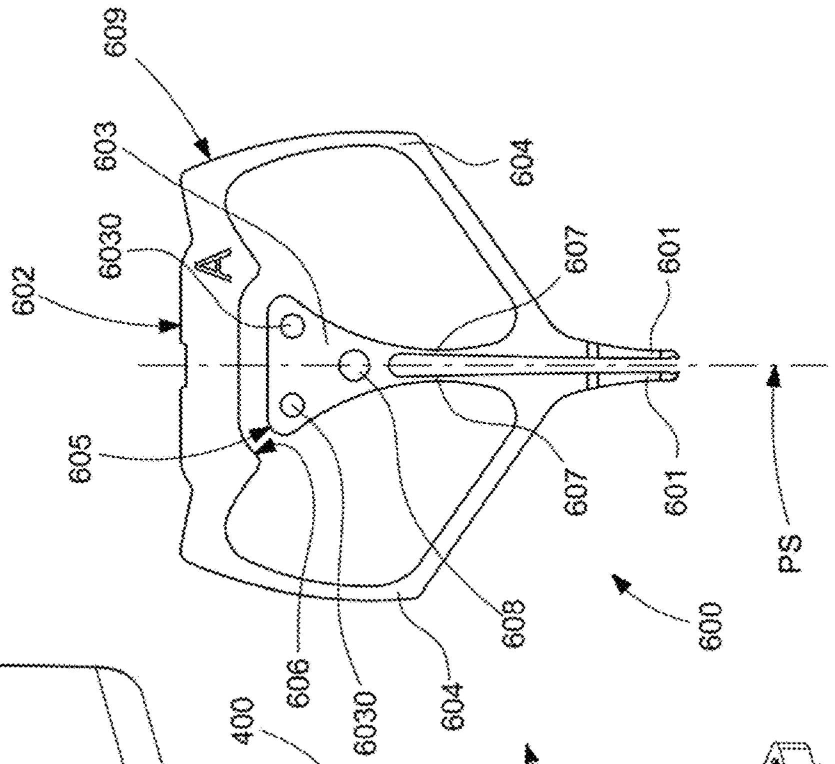
FIG. 3 represents, schematically, and in a plane view, the clamp in FIG. 2.

More specifically, the clamp 600 includes an attachment zone 603 which is more rigid than the elastic arms and the second elastic arms 604, for attaching the clamp 600 to a clamp-holder body 401 included in the setting and/or adjustment module 400; this attachment can be carried out by combining at least one positioning pin driven into a pin hole 6030 seen in FIG. 3, and at least one screw or similar attached at the level of a mounting 608.

And, more specifically, the clamp 600 includes at least one bearing portion 602, which is more rigid than the first elastic arms 607 and the second elastic arms 604.

Advantageously, the first elastic arms 607 are substantially aligned with the clamp arms 601.

The system can operate without abutment on complementary surfaces.

Where applicable, the design of the spindle 407, particularly a cam, enables risk-free 360° rotation for the clamp 600.

In a specific alternative embodiment, the attachment zone 603 includes limiting surfaces 605, which are arranged to cooperate in abutment pressure with complementary limiting surfaces 606 included in the bearing portion 602, so as to limit the deformation of the clamp 600.

In a specific execution corresponding to FIGS. 1 to 3, the clamp 600 is held in reference by two pins and a gripping screw. The shape of the clamp 600 is optimised so as not exceed the elastic limit stress of the material as well as the maximum value of the force exerted by the spindle 407, particularly a cam. In the specific application of the adjustment of a setting organ, particularly the action on a balance setting screw, the profile (thickness, angular position) of the arms 601 and 604 is defined to be compatible with space available to grip the setting screw in the balance, to enable angular pivoting of the clamp 600 to perform the setting process thereof, without touching the watch case, and, in a specific and non-restrictive execution, to make it possible to have a gripping force of up to 40 N per arm at the end of cam travel (about 0.6 mm).

In sum, the vertical axis Z makes it possible to manage the lowering in position of the clamp 600 at the level of a setting screw, the control of the rotary clamp opening/closing axis Θ1 triggers the opening of the clamp 600 to grip a setting screw, then the closure of the clamp 600 around this setting screw. The handling of the rotary clamp setting axis Θ2 actuates the screwing or unscrewing of the setting screw, as a watchmaker would.

For applications other than setting screws, the clamp 600 can be used both as a rotation setting tool and as a linear movement tool such as a riveting head, a peg, a pin-punch, a chisel, a mandrel, or other. The clamp 600 can then be used as a deformation or engraving tool.

More specifically, the setting machine 1000 further includes at least one further setting module which is a drive module 300. This drive module 300 includes drive means 301, which are arranged to drive, at least in rotation, at least a component or a mobile component, included in such a horological assembly 1 borne by a receptacle 10, on command from the control means 3000.

Figure 4:
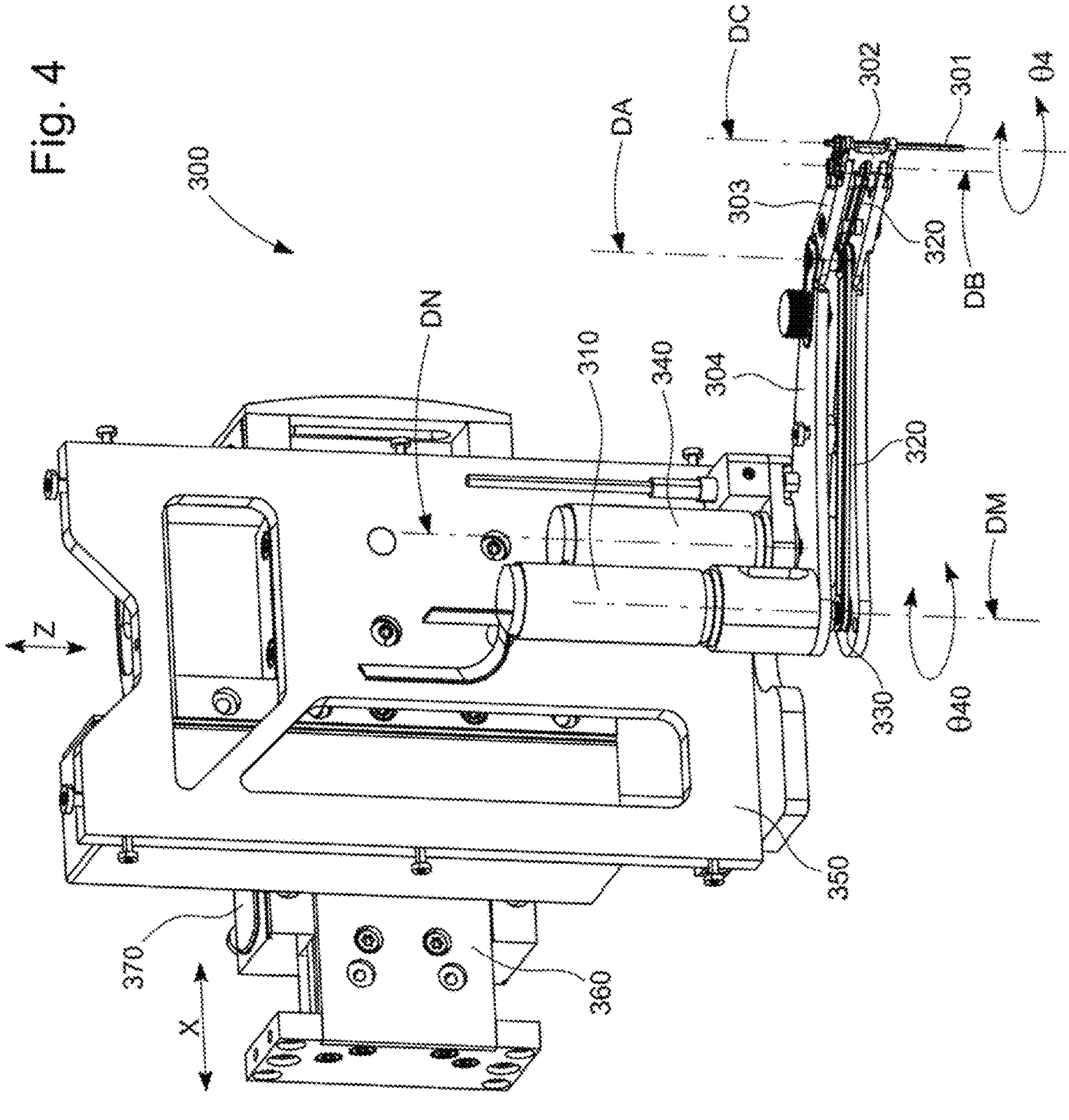
FIG. 4 shows, similarly to FIG. 2, a drive module arranged to drive, at least one rotation by means of a rotary driver, such a component or mobile component.

More specifically, this drive module 300 is a balance drive module, illustrated by FIG. 4. This drive module 300 includes a body 310 that can move at least along a vertical direction Z parallel with the vertical of the location, and relative to which a motorised driver 301 can move in an articulated fashion, which rotates about a driver axis DC parallel with the vertical direction Z, or substantially parallel with the vertical direction Z.

More specifically, in the non-restrictive arrangement illustrated by FIG. 4, this body 310 includes positioning means 340, which are arranged to position in rotation, about an axis DN parallel with the vertical direction Z, at least one return arm 303, 304, relative to which a driver arm 302 bearing the driver 301 is pivotally mounted, about an intermediate axis DB parallel with the driver axis DC.

And this body 310 bears drive means 330 for driving the driver 301 in rotation, via belt, or chain, or gear, or cardan joint transmission means 320, or similar.

More specifically, the positioning means 340 are arranged to angularly position at least one return arm 304, to which a return arm is connected, which is the driver arm 302, or a forearm 303 to which the driver arm 302 is connected.

FIG. 4 thus illustrates, on one hand, a first motor 310 which rotates the belts 320 which drive the driver shaft 301 in rotation, and, on the other, a second motor 340, which rotates about the axis thereof DN the complete assembly 310, 304-303-302, 301-320-330.

The arm can be retracted using the body around the motor axis thereof. This arm is manually adjustable about the 2 axes DA and DB. This setting is defined according to the calibre to be set.

More specifically, the body 340 is borne by a cross XZ movement table in a vertical plane through the vertical of the location, including a carriage 350 which is borne by a carriage 360 which can move relative to a table base 370 attached to the frame 2000.

The drive module 300 advantageously includes a rotary axis Θ40 for rotating the transmission means 320, and the driver 301 can be rotated along a rotary axis Θ4.

This arrangement enables optimal positioning of the rotation driver finger 301 relative to the balance.

More specifically, the setting machine 1000 further includes at least one further setting module which is a holding and/or bearing module 500, particularly a bearing finger module, and which includes holding and/or bearing means 501.

This holding and/or bearing means 501 are arranged to exert a substantially axial pressure on a mobile component or a component of an assembly 1 during or after a setting and/or an adjustment made on an assembly 1 by the setting and/or adjustment module 400, or indeed to keep the mobile component or component contact-free by the action of a magnetic or electrostatic field, along a direction DE which, in a specific application is parallel with the vertical of the location, or which forms an angle of less than 10° with the vertical direction of the location.

More specifically, in the alternative embodiment illustrated by FIG. 1 which is particularly compact, this at least one holding and/or bearing module 500, particularly a bearing finger module, is borne by the at least one positioning module 100. It can however be independent thereof, and attached directly to the frame 2000 of the setting machine 1000, or on a movable carriage included in this setting machine 1000.

Figure 5:
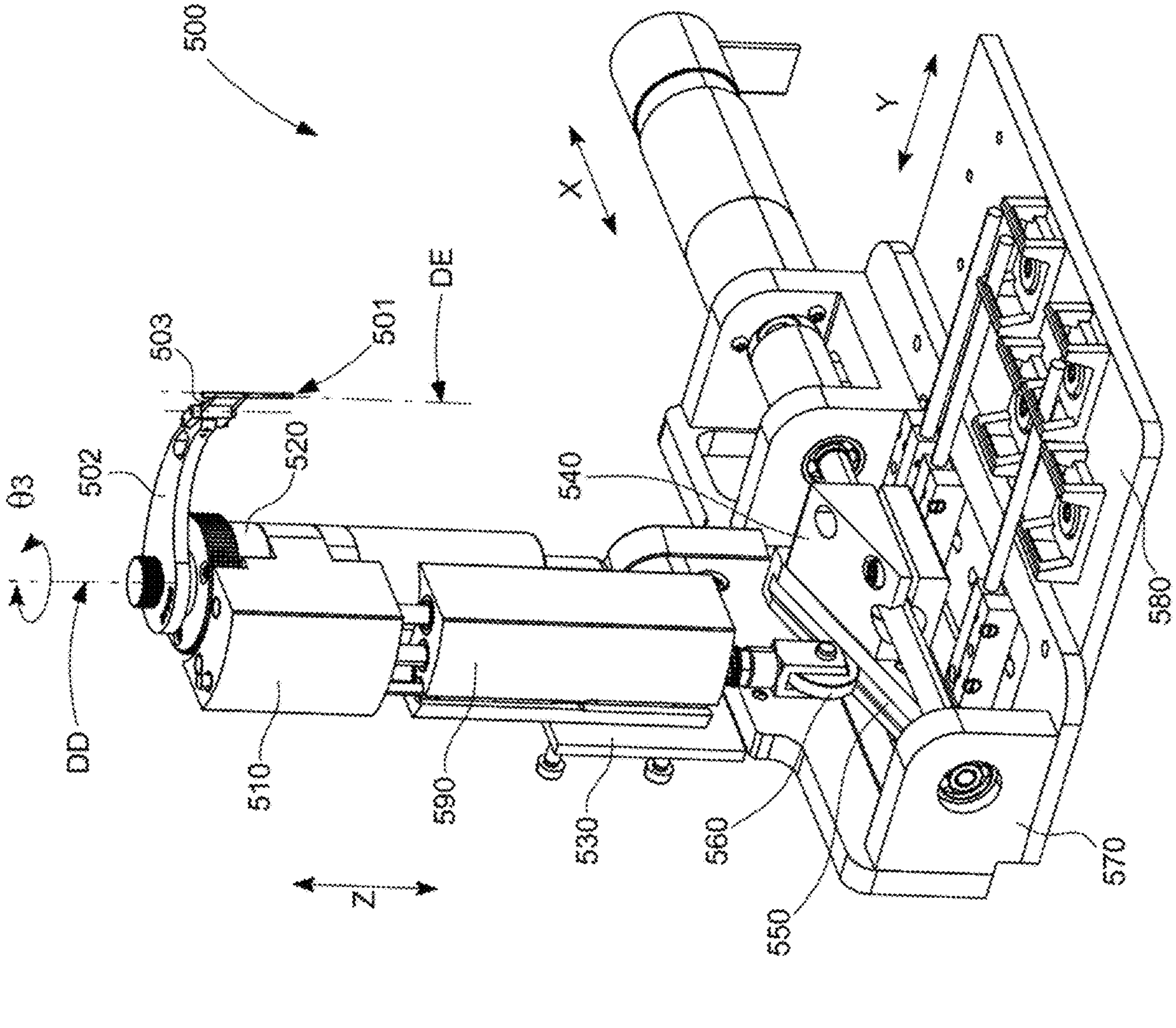
FIG. 5 represents, similarly to FIG. 2, a holding and/or bearing module, including a bearing finger arranged to exert a substantially axial pressure on this mobile component or component.
Figure 7:
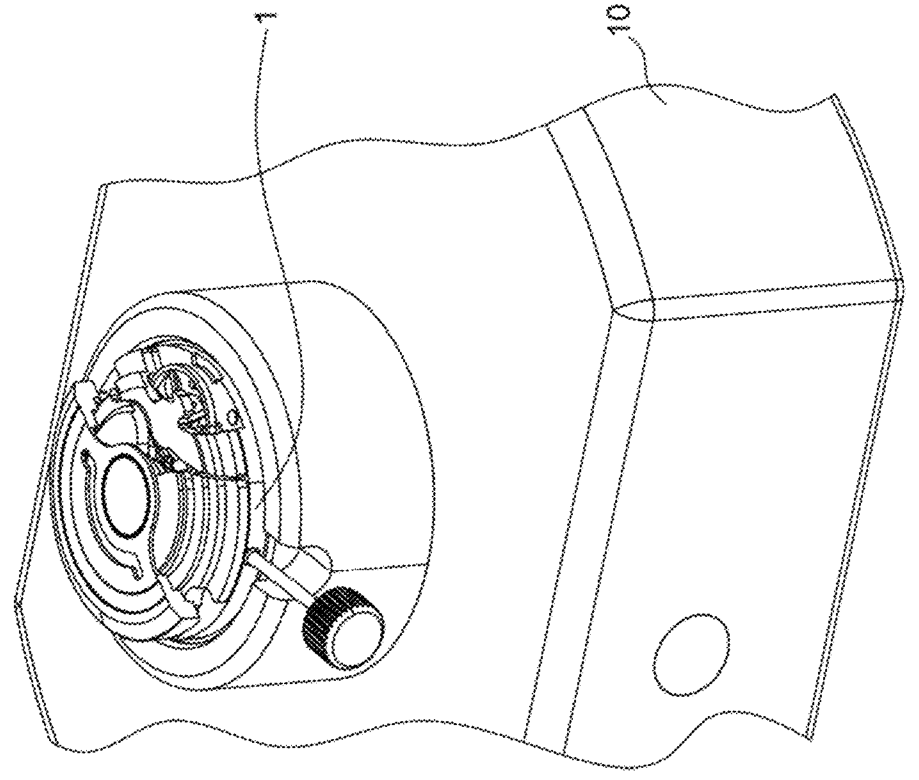
FIG. 7 represents, schematically, partially and in a perspective view, another receptacle which is a support, bearing herein a horological movement disposed in position for the setting thereof on the setting machine.
Figure 6:
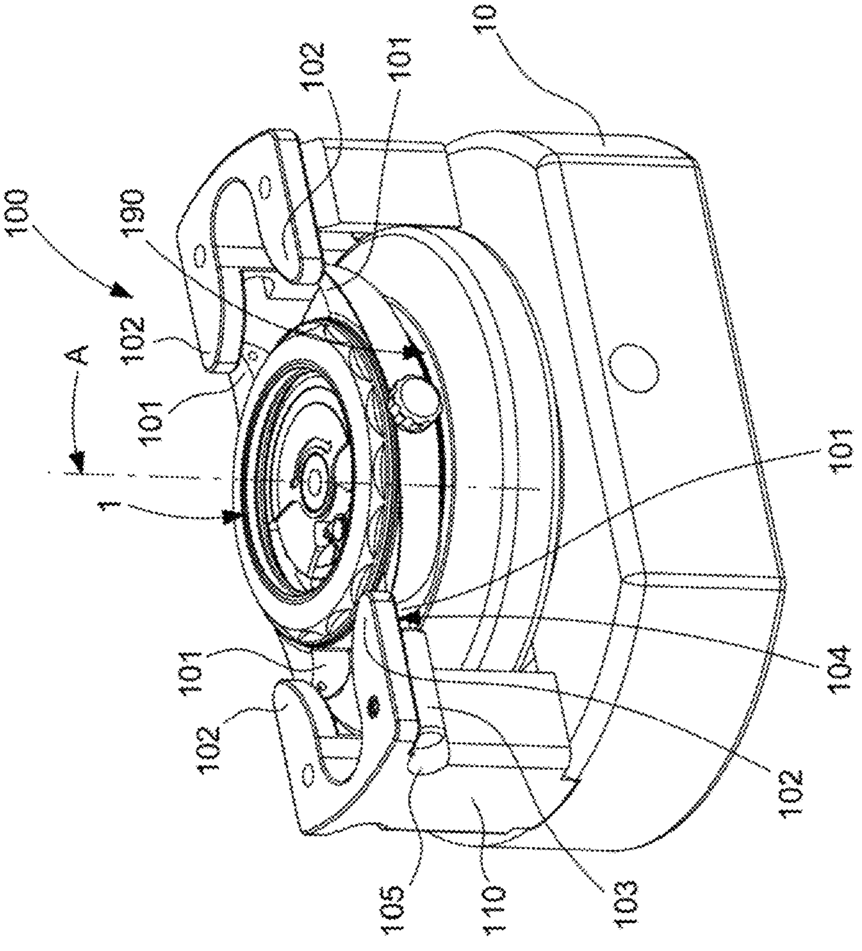
FIG. 6 represents, schematically, and in a perspective view, a receptacle which is a support, bearing herein a watch head disposed in position for the setting thereof on the setting machine.

More specifically, in the non-restrictive arrangement illustrated by FIG. 5, this at least one holding and/or bearing module 500 includes a body 520, which rotates along a rotary axis Θ3 for the rotation relative to a vertical direction DD parallel with the vertical of the location and which drives a carrier arm 502 which bears, in a fixed or articulated manner, the holding and/or bearing means 501.

The design of this pressure uses a similar principle to the setting clamp 600, i.e. the use of material elasticity. In the application of the setting machine 1000 according to the invention to setting a sprung-balance oscillator, it is essential, in order to prevent stress on the balance shock-proof devices, to exert the lowest and most controlled pressure force possible.

A first alternative embodiment of pressure includes a shaft with bronze bearing-block guidance, which presses by its own weight on the balance to lock it in rotation, and requires a perfect setting of the guidance play to ensure that the shaft falls from its own weight, while preventing any locking of the balance, or harmful axial stress on the balance.

An alternative embodiment, corresponding to the figures, applies a bearing principle by elastic guidance which meets these requirements. Preferably, this bearing system is slightly inclined so as not to generate a shadow zone on the balance, which can disrupt the detection of the setting screw by the optical means included in the setting machine 1000, which explains the benefit of a slightly inclined direction DE.

In an alternative embodiment, the holding and/or bearing means 501 include a bearing finger which is a mass, kept guided by elastic guidance means 503, attached to the carrier arm 502 and which are arranged to keep the mass bearing on a mobile component or component by applying a substantially vertical force. These elastic guidance means 503 can particularly consist, as seen in FIG. 5, of two flexible strips substantially parallel with one another and slightly inclined relative to the horizontal, and which form a deformable parallelogram with the bearing finger 501 and the structure bearing it.

In a further alternative embodiment not illustrated, the holding and/or bearing means 501 include a bearing finger which is a mass guided in a housing of the carrier arm 502 and which is arranged to hold by its own weight a mobile component or component.

Advantageously during the use of measuring and/or testing means of the acquisition module 200 which are optical means, the holding and/or bearing module 500 is arranged to orient said holding and/or bearing means 501 along a direction DE slightly inclined relative to the vertical, so as to clear the field of view of these apparatuses.

More specifically, the body 520 can rotate relative to a body 510, which can move along a vertical direction Z parallel with the vertical of the location, relative to a structure 590 which is, either attached to the frame 2000, or attached to a carriage 530, 570, that can move relative to a base 580 attached to the frame 2000.

In an alternative embodiment, this body 510 can move along the vertical direction Z relative to a carriage borne by a base carriage 570 with horizontal movement Y, or X, or with cross movements XY in a horizontal plane perpendicular to the vertical of the location, relative to a base 580 attached to the frame 2000.

In a further alternative embodiment illustrated by FIG. 5, the body 510 can move relative to a structure 590 which is, either attached to the frame 2000, or attached to a carriage 530, 570 that can move relative to a base 580 attached to the frame 2000, under the joint action of a rolling spindle 560 borne by the body 510 and a ramp 550 included in a ramp carriage 540 that can move relative to a base carriage 570 along a horizontal direction X in a horizontal plane perpendicular to the vertical of the location.

In sum, the holding and/or bearing module 500 is arranged to hold in a substantially axial position, along the vertical direction Z or along such a direction DE, a mobile component or component of an assembly 1 during or after the driving of the mobile component or component by the drive means of this at least one drive module 300. This holding in axial position is suitable at the end of the driving of this mobile component or this component.

The holding and/or bearing module 500 provides a safe alternative to conventional stop-second type mechanisms, the strips whereof are liable to damage the balance. The axis Z enables the descent of the bearing finger 501, and the axis Θ3 enables the rotation of the arm 502.

More specifically, the acquisition module 200 includes viewing means to scan the work zone. In particular, in the application of the setting machine 1000 to setting a spring-balance oscillator, the viewing means are arranged to detect the entire surface of the balance, or any zone required for setting the setting screws. These viewing means furthermore enable the detection of the number or type of a setting screw, or the reading of an engraving made on the felloe of the balance to determine the number and type of the setting screws.

More specifically, the acquisition module 200 can move at least along a vertical direction Z parallel with the vertical of the location, and includes viewing means arranged to determine the position of a surface of a mobile component or component, and/or to determine the nature and the position of at least one setting organ included in an assembly 1, such as a setting screw, inertia-block, balance-spring stud, index, or similar.

More specifically, the acquisition module 200 can move along a vertical direction Z parallel with the vertical of the location, and includes viewing means and laser measuring means, and an automatic adjustment device of the viewing and laser focal positions relative to a mobile component or component of an assembly 1 borne by a receptacle 10, for the exact determination of the position of the top surface of the mobile component or component along the vertical direction.

More specifically, the setting machine 1000 includes at least one optical module 700, which is borne directly or indirectly by the frame 2000, or by the positioning module 100, or the acquisition module 200, or one of the setting modules 300, 400, 500, included in the setting machine 1000. This optical module 700 is interfaced with the control means 3000, for the optical testing of a component or a mobile component during the setting thereof or during an oscillation to which it is subjected.

More specifically, the positioning module 100, and/or the acquisition module 200, includes identification means for identifying a receptacle 10, which advantageously includes a receptacle identification marking or index or component, and for identifying each assembly 1 borne by the receptacle 10, said assembly 1 advantageously includes a product identification marking or index or component.

More specifically, the setting machine 1000 includes at least one such optical module 700 borne directly or indirectly by the frame 2000, and interfaced with the control means 3000, for the optical testing of a mobile component or component during the setting thereof or during an oscillation to which it is subjected, and/or to form means for identifying a receptacle 10 and for identifying each assembly 1 borne by the receptacle 10.

More specifically, each receptacle 10 includes, for receiving an assembly 1, a substantially planar bearing surface 190, which, in a specific, horizontal, operating position extends in a substantially planar manner along a horizontal plane perpendicular to a vertical direction Z parallel with the vertical of the location.

Naturally, the setting machine 1000 can include a manipulator to move such a receptacle 10 spatially, which then makes it possible, in the case where the assembly 1 includes an oscillator for which it is sought to test the chronometric properties, to present this assembly 1 in standardised chronometric testing positions, in a static position in the different angles, or for dynamic testing via the standardised positions and orientations, particularly as described in the document EP3486734 held by MONTRES BREGUET.

The receptacle 10 includes positioning and orientation means relative to the table 109 of the positioning module 100.

More specifically, the receptacle 10 is a support which includes, below the bearing surface 190 thereof, a spring mechanism 180 for receiving an assembly 1, and, above the bearing surface 190, locking wedges 102 of an assembly 1. This receptacle 10 further includes, between the bearing surface and the locking wedges 102, angular orientation means 103 for the angular orientation in abutment pressure of an edge of the assembly 1 on the support.

Figure 8:
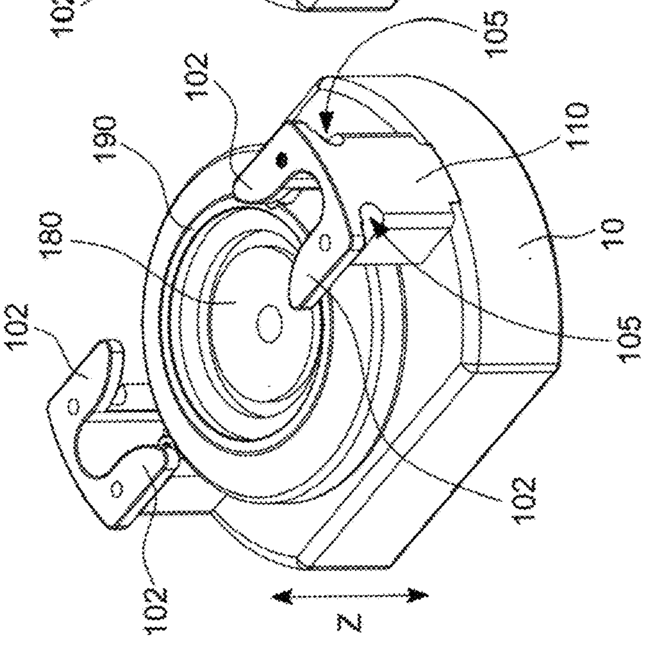
FIGS. 8 to 10 successively illustrate, schematically, and in a perspective view.
Figure 9:
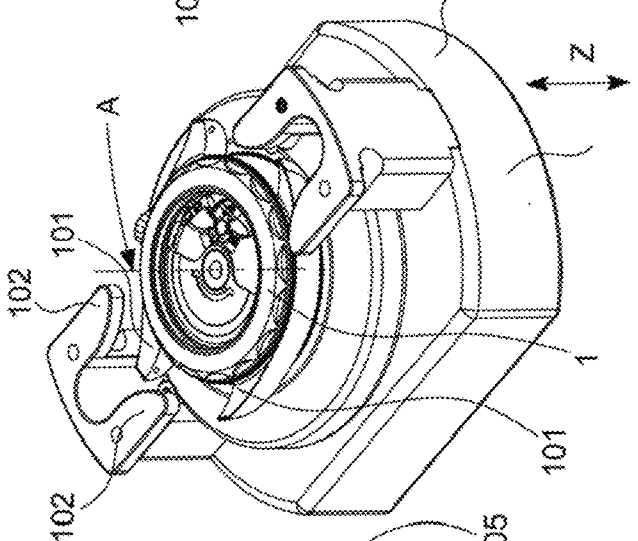
Figure 10:
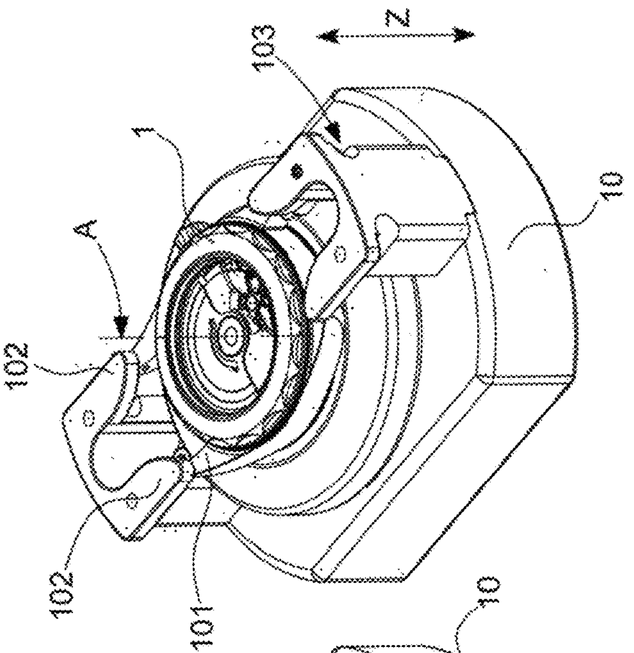
Figure 11:
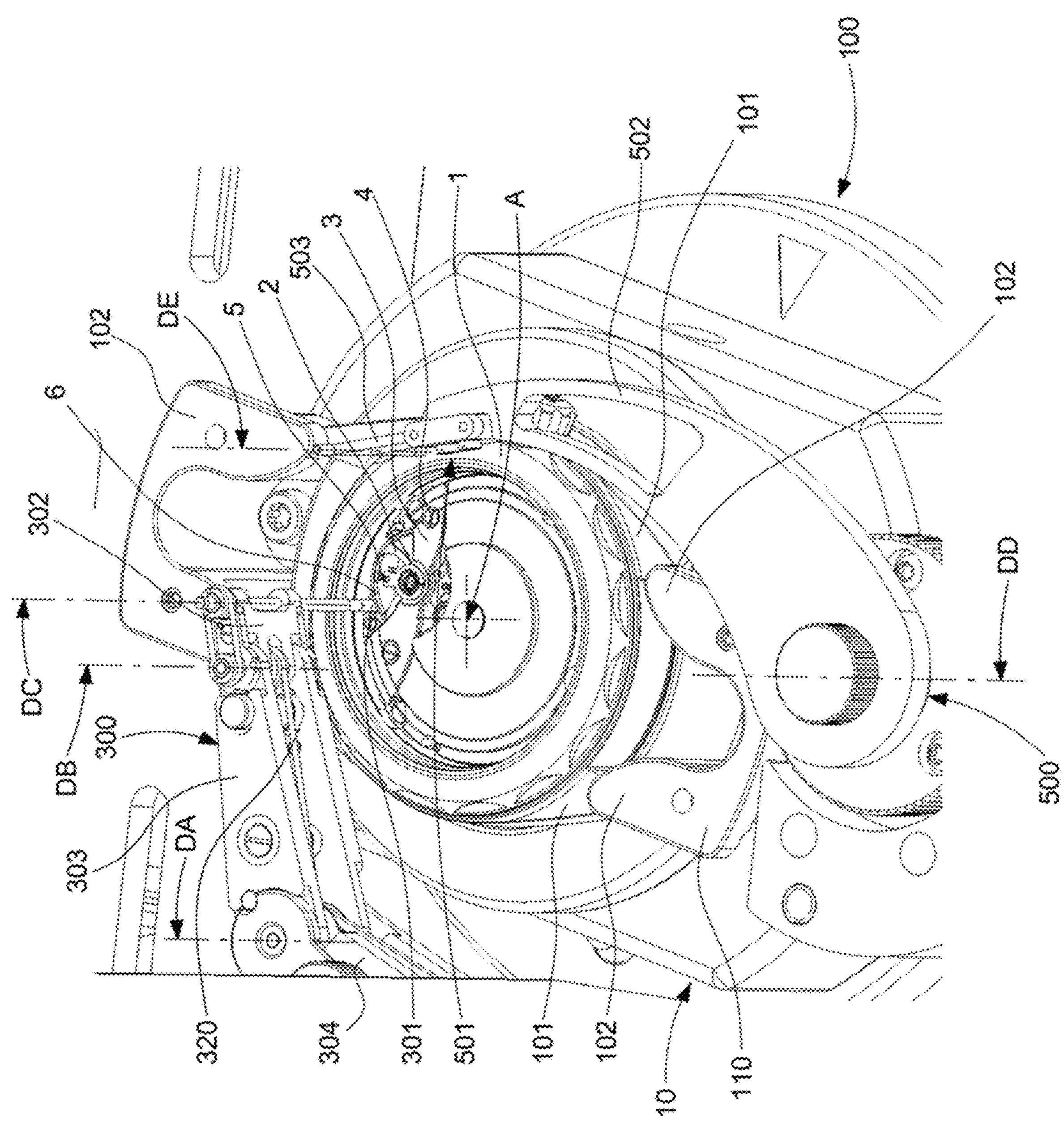
FIG. 11 represents, schematically, and in a perspective view, the cooperation of the drive module in FIG. 4, and of the holding and/or bearing module in FIG. 5, with a balance included in the watch head mounted on the receptacle according to FIG. 10.
Figure 12:
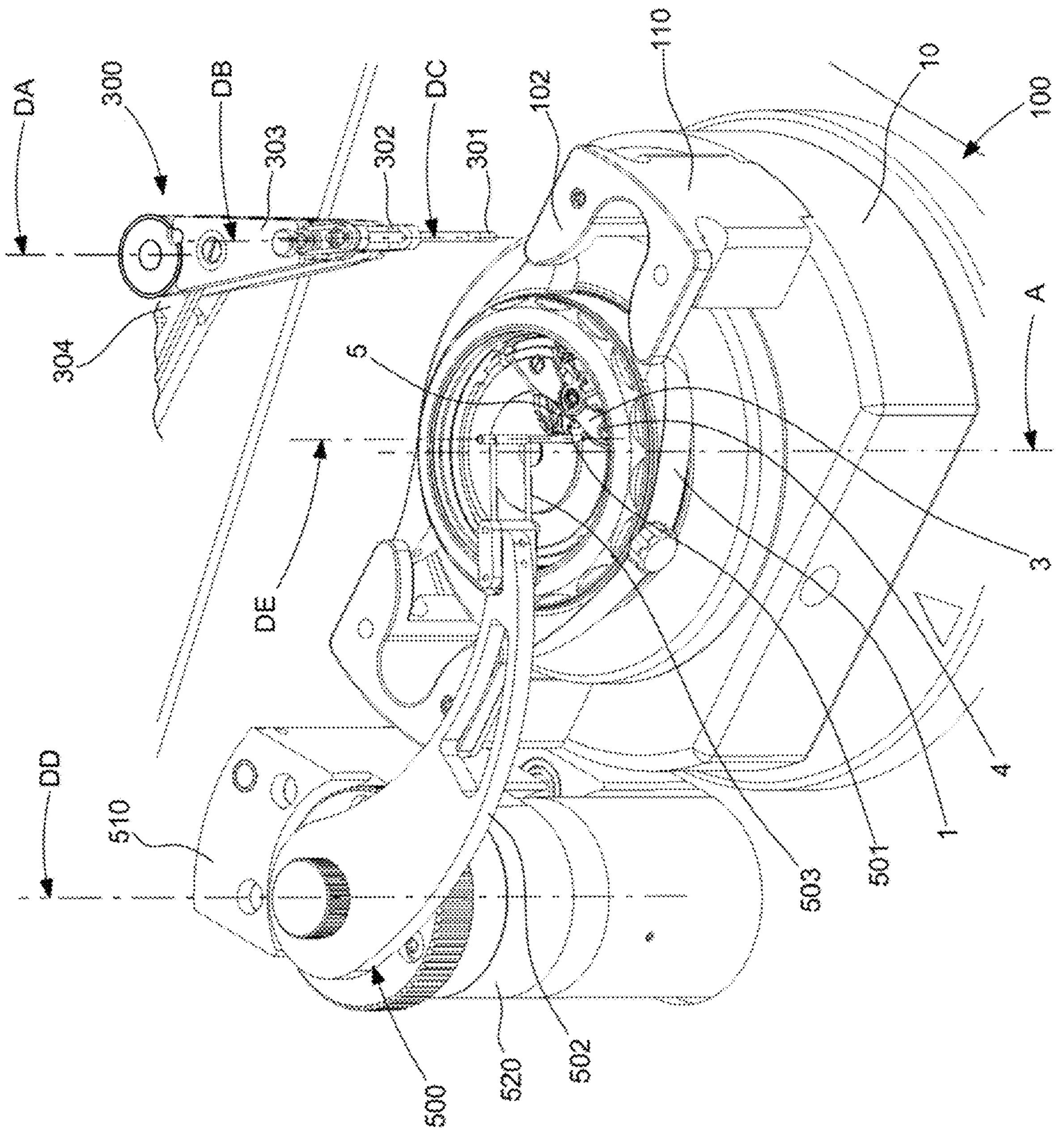
FIG. 12 is a similar view to FIG. 11, where only the bearing finger cooperates in bearing with the balance, while the driver is in the released position relative to the watch head.
Figure 13:
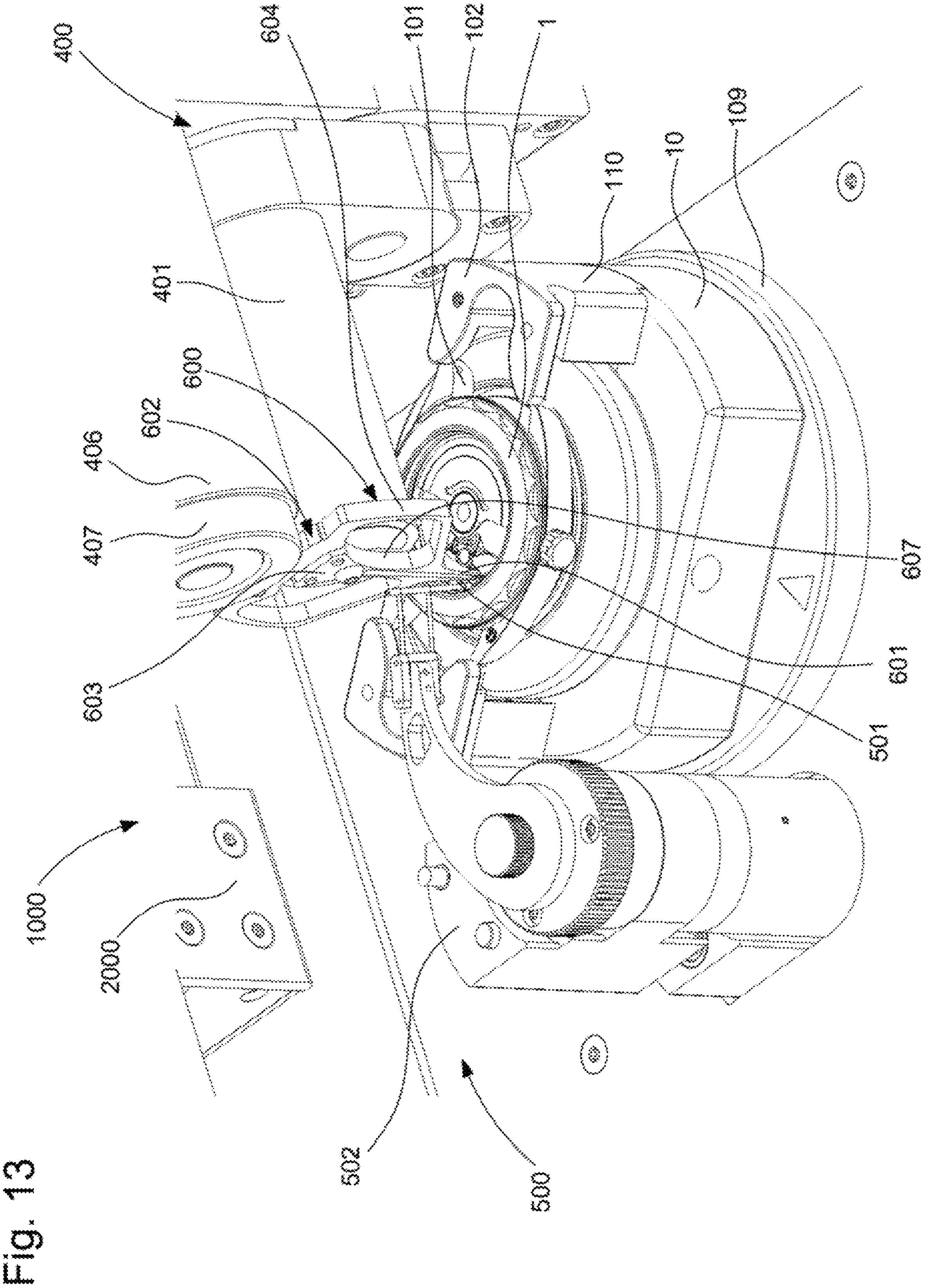
FIG. 13 is a similar view to FIG. 11, where the clamp is introduced into the movement is cooperates with a setting screw of the balance, and where the bearing finger holds the balance.
Figure 15:
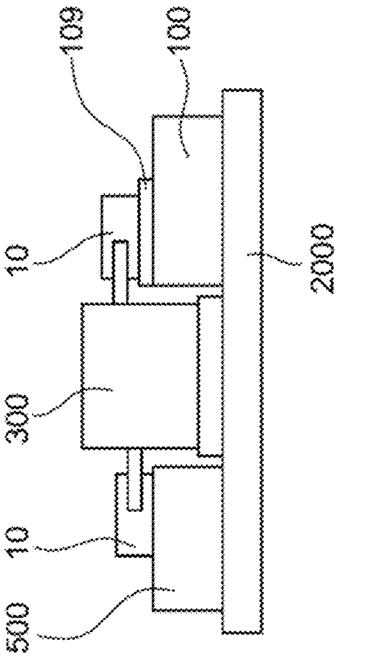
FIG. 15 is a schematic diagram, in elevation, of a detail of an alternative embodiment of the setting machine in FIG. 1 or 14, including a palletiser for replacing a receptacle between the table of the positioning module, on one hand, and of a frequency analyser, or of a device for testing the rate not shown, on the other.
Figure 14:
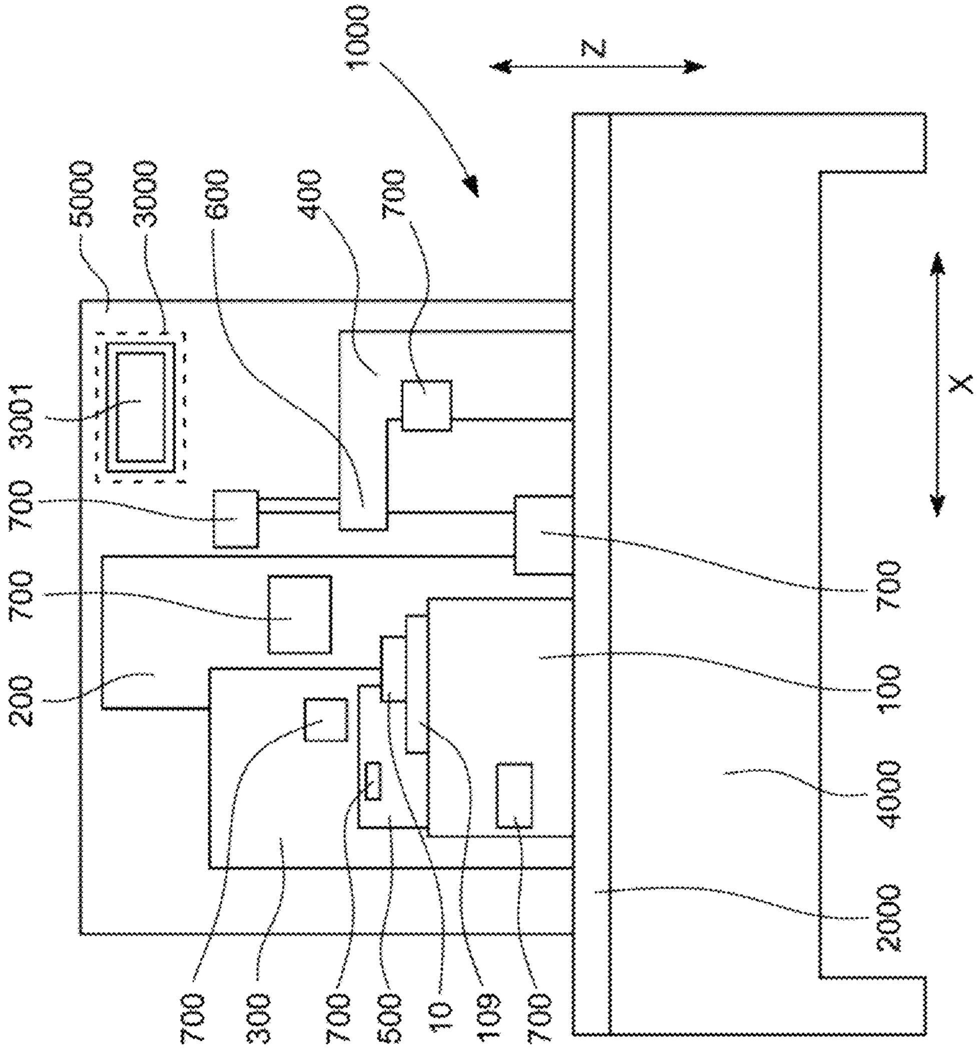
FIG. 14 is a schematic diagram, in an elevation view, of an alternative embodiment of the setting machine in FIG. 1, cased and mounted on a watchmaker's bench, and including a plurality of optical modules.
Figures 16, 17:
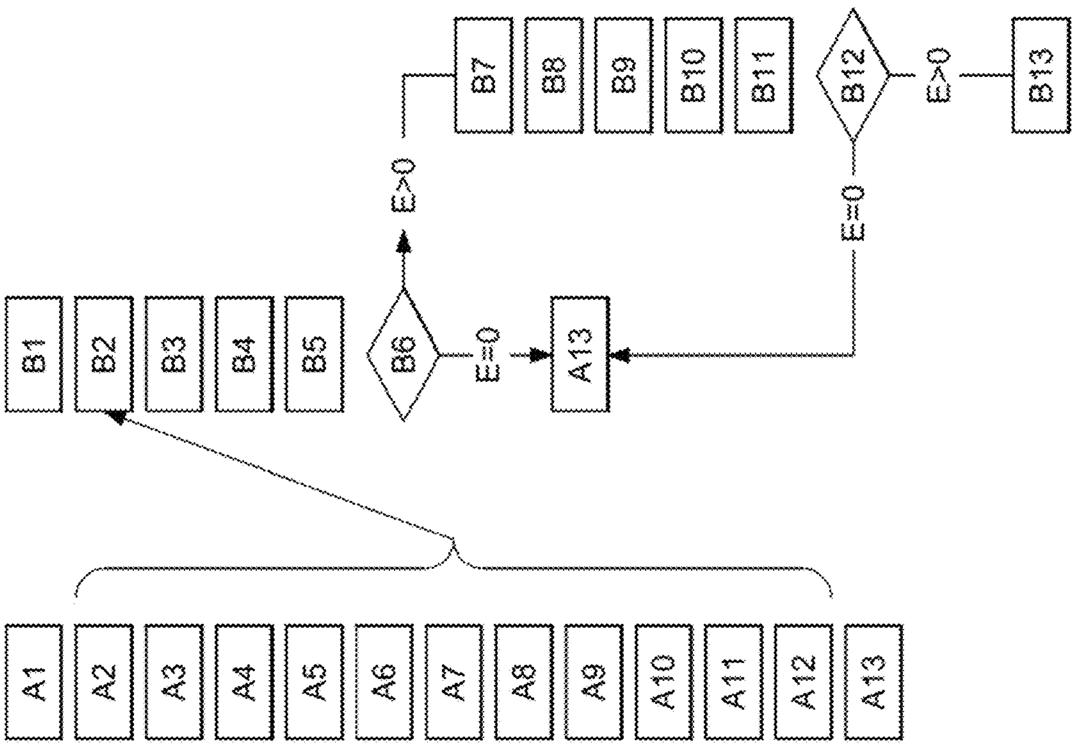
FIG. 16 is a logic diagram of the steps of setting the setting screws of a balance included in a sprung-balance oscillator, on the setting machine according to the invention, in a first alternative embodiment in an open loop.
FIG. 17 is a logic diagram of the steps of setting the setting screws of a balance included in a sprung-balance oscillator, on a setting machine according to the invention including a frequency analyser and/or a device for testing the rate, in an alternative embodiment in a closed loop.

FIGS. 8 to 10 successively illustrate the preparation of the support for receiving a watch head, with two clamps or locking wedges 102 which are forks arranged to bear on horns 101 of the watch head, the deposition of the watch head 1 on the spring mechanism 180 and bearing on the bearing surface 190 and in an angular position where the horns 101 are outside the arms of the forks of the locking wedges 102, then finally the rotation of the watch head 1 to an angular abutment pressure position of one of the horns 101 on a pin 103 forming the angular orientation means, guided in a pin housing 105, the abutment pressure position wherein the spring mechanism 180 ensures a good hold. The watch head is held along the vertical direction Z by the locking wedges 102, the bottom surface 104 whereof bears on the horns 101 of the watch head. The watch head bears herein on the watch crystal, a centring is performed at the level of the bezel or the watch case. The spring mechanism 180 ensures a controlled bearing force. More specifically, the receptacle 10 includes interchangeable units 110 bearing locking wedges 102 and pin housings 105, and which are, each, adapted to a specific type of movement or watch head.

It is understood that such a receptacle can then be handled like a machining centre pallet, and be moved between an input station, an optional store, and an output station, via a setting and/or adjustment position on the setting machine 1000. For this purpose, the receptacle 10 can, in an alternative embodiment not illustrated by the figures, include, particularly on the bottom face thereof, gripping means similar to those included in machining centre pallets: Jaw or ISO or SA cone, T groove, dovetail, or similar, and also similar positioning means: bores, pins, grooves, or others.

More specifically, the setting machine 1000 includes a palletising mechanism, for the automatic replacement of receptacles 10 on the positioning module 100.

In an alternative embodiment, simple palletisation, for example a palletiser 900, transfers the receptacle 10 to a frequency analyser 800, without modifying the position of the positioning module, and an optional return of the receptacle 10 to fine-tune the correction of the balance, is performed after redepositing the receptacle 10 on the table of the station whose position has not changed.

In a further alternative embodiment, the setting machine 1000 is directly equipped with a device for starting oscillation, and includes optical means 700 with a camera and a watch, for optical testing of the frequency.

Advantageously, the setting machine 1000 is equipped with a device for testing the rate after setting. Such a palletiser 900 can also be used to transport the receptacle 10 onto such a device.

More specifically, and when the assembly 1 includes an oscillator, the setting machine 1000 includes a frequency analyser 800 and/or a chronometric testing apparatus coupled with the control means 3000, which are programmed to trigger a setting iteration on a setting organ until entry into a required frequency and/or rate tolerance.

The use of the setting machine 1000 for setting balance setting screws is simple, it is simply necessary to clear any oscillating mass beforehand from the work zone. The receptacle 10 is positioned below the viewing means of the acquisition module 200, which defines the position of the balance axis along XY, and which controls an XY movement of the receptacle 10 if required, or, in an alternative embodiment, an angular movement of this receptacle, or a more complex movement combining rotation(s) and translation (s). The setting screw search is carried out by driving by friction the felloe of the balance by the driver 301. A descent along Z follows. Once the setting screw is in the setting position in the plane, the vertical position thereof is measured: the laser position measurement along Z of a setting screw can be carried out on a shoulder or on a flat area of a setting screw, the geometric parameters whereof are known and managed by the control means 3000.

This indeed consists of positioning the arms 601 of the clamp 600 precisely in symmetry relative to the axis of the setting screw, so as not to create another torque on the screw than the screwing or unscrewing torque. The balance is then locked in position with the bearing finger 501, to hold the position of the balance and as closing the clamp generates a slight strain on the balance which can result in a maximum movement along Z of the order of 30 micrometres; the driver 301 is then released.

The setting is then performed by screwing or unscrewing the setting screw.

The invention further relates to a method for using such a setting machine 1000 for setting and/or adjusting at least one horological component. This method includes relative movements between the different modules of the setting machine 1000, it is described herein for the setting machine illustrated by the figures, those skilled in the art will be able to extrapolate it to similar architectures, according to the mobility or not of each module, and the arrangement of the work axes for the different units. All these movements are therefore relative movements.

According to this method:

- at least one receptacle 10 is equipped with at least one assembly 1 which is a horological movement or a watch of axial direction A, and for which it is sought to set and/or adjust at least a mobile component or a component of this assembly 1;
- the axial direction A thereof is aligned with the vertical of the location,
- the acquisition module 200, the setting and/or adjustment module 400, and each setting module 300, 500, included in the setting machine 1000 are cleared to the end of travel, so as to clear a work zone for the measurement, setting and/or adjustment;
- a receptacle 10 is loaded onto the positioning module 100;
- the position of the receptacle 10 is made coincident with that of the work zone, and to do this, according to the configuration of the setting machine 1000, either the receptacle 10 is conveyed into the work zone, or all or some of the modules forming this setting machine 1000 are conveyed above the receptacle 10;
- the positioning module 100 is conveyed below the acquisition module 200;
- a target setting value of at least one parameter is determined;
- the value of the at least parameter measured on this at least one assembly 1 is sent to the control means 3000;

a programming cycle of the acquisition module 200 is selected to measure at least the position of the top surface of the mobile component or component along the vertical direction of the location;

the position and any measurement made according to the programming cycle is sent to the control means 3000 which generate, according to the programming cycle selected, positioning movements of the positioning module 100 to place the assembly 1 in a set position, and/or movement and operating orders to each setting module 300, 400, 500, included in the setting machine 1000, according to a programmed sequence at the work zone.

More specifically, the setting machine 1000 is equipped with at least one holding and/or bearing module 500, which is arranged to exert pressure on a mobile component or component of an assembly 1 during or after a setting and/or an adjustment made on an assembly 1 by another setting module 300, 400, 500, or indeed to keep the mobile component or component contact-free by the action of a magnetic or electrostatic field, particularly along a vertical direction DE parallel with the vertical of the location. This holding of pressure is suitable at the end of the driving of this mobile component or this component.

More specifically, the setting machine 1000 is equipped with at least one drive module 300, which includes a motorised driver 301 rotating about a driver axis DC parallel with the vertical direction Z for driving the mobile component or component.

More specifically, the setting machine 1000 is equipped with at least one setting and/or adjustment module 400, which includes a clamp 600 for driving or deforming the mobile component or component, and the parameter is set by actuating the clamp 600 on at least one mobile component or component of the assembly 1.

More specifically, the setting machine 1000 is equipped with at least one optical module 700 for the optical testing of the mobile component or component during the setting thereof or during an oscillation to which it is subjected.

More specifically, the setting machine 1000 is equipped with at least one means for measuring the parameter, interfaced with the control means 3000, and the setting cycle is repeated until a value of the parameter compatible with the target value is obtained.

More specifically, the setting machine 1000 is equipped with at least one palletiser 900 to remove the receptacle 10 from the setting machine 1000 into an output position that is stored in memory, the palletiser is used to submit the receptacle 10 to the means for measuring the parameter, then to return the receptacle 10 to the output position to resume the setting and/or adjustment cycle of the assembly 1.

More specifically, the setting machine 1000 is equipped with at least one means for measuring the parameter, to measure the value of the parameter before resuming the setting and/or adjustment cycle of the assembly 1.

In the application to setting a sprung-balance oscillator, the simplest implementation of the method is in open loop: a previously measured assembly 1 is received, the value of the corrections to be made is known, the target value and the actual value of the watch or movement are entered; the correction of the setting screws is then performed on the machine, and the assembly 1 returned without testing.

For example, the following sequence describes the operations performed on a watch head 1, including a balance equipped with two setting screws, in an application where only the balance and the setting screws thereof are actuated:

Step A1: Loading of the watch head 1 in the support of the receptacle 10;

Step A2 (Station 01): Detection of the balance axis centre, position correction to obtain the machine origin;

Step A3 (Station 01): Rotation of the balance;

Step A4 (Station 01): Detection of the first setting screw by camera system;

Step A5 (Station 01): Locking of the balance in position;

Step A6 (Station 02): Movement under laser sensor, measurement of the balance position along Z;

Step A7 (Station 03): Tightening of the screw and setting of the screw;

Step A8 (Station 01): Return to setting screw detection position;

Step A9 (Station 01): Rotation of the balance for setting screw detection by camera system;

Step A10 (Station 01): Locking of the balance in position;

Step A11 (Station 02): Movement under laser sensor, measurement of the balance position along Z;

Step A12 (Station 03): Tightening of the screw and setting of the screw;

Step A13: Unloading of the watch head from the support,

Naturally, this sequence is to be adapted according to the number of setting screws.

In the example above, the clamp 600 only acts upon the setting screws: the screw is tightened or loosened to modify the inertia of the balance. Opening/closing the clamp 600 uses the elasticity of the material, as the clamp 600 is preferably a monolithic part. A spindle 407, particularly with a cam profile, controlled by a motor opens/closes the clamp 600.

The acquisition module 200 includes a laser, which detects the block wherein the setting screw is placed. The laser makes it possible to define the position along Z of the balance to convey the clamp 600 in the same axis as the setting screw, as the objective is to tighten/loosen the screw in the axis so as not to exert a parasitic torque. The target value (for example 2.5 s/day) is handled at the level of the control means 3000. The current rate value is entered by software. The system allows a reduced complete cycle time, of the order of 50 to 70 seconds, according to the number of screws to be set.

Use in closed loop requires that the setting machine be equipped with an analyser, which renders it complex and requires more space, but makes it possible to check the attainment of the target value on the station.

It is then possible to perform the following cycle:

Phase B1: Entry of the target value and the actual value of the watch;

Phase B2: Correction of the setting screws on the machine according to steps A1 to A12;

Phase B3: Release of the movement/watch head after correcting the setting screws;

Phase B4: Rate testing on movement or on watch head on analysing apparatus;

Phase B5: Check of the deviation between the target value and actual value;

Phase B6:

- if the deviation is zero, validation of the correction made, unloading according to A13;
- if the deviation is positive, an additional correction is needed, with then iteration of the process:

Phase B7: Entry of the target value and the measured value of the watch;

Phase B8: Correction of the setting screws on the machine;

Phase B9: Release of the movement/watch head after correcting the setting screws;

Phase B10: Rate testing on movement or on watch head on analyser;

Phase B11: Check of the deviation between the target value and actual value;

Phase B12:

if the deviation is zero, validation of the correction made and of the assembly 1, unloading according to A13;

if the deviation is positive, removal of the assembly 1 without validation at testing station B13.

The setting machine 1000 can, furthermore, be equipped with a camera coupled with a clock, for optical frequency testing.

The setting machine according to the invention can be used for numerous horological applications.

More specifically, the setting machine 1000 is used for setting a setting screw which is a balance inertia-block or a balance bridge setting screw or a balance-spring stud setting screw, or a division setting screw, or an alignment setting screw, or for setting an index.

More specifically, the setting machine 1000 is used to make a division setting by adjusting along Z and actuating a screw or a centre-punch, or an alignment setting, or a position setting in a slot, or other.

More specifically, the setting machine 1000 is used for the local deformation of a bridge or a balance-spring or an arm or a felloe of a balance.

In sum, the invention offers various advantages:

the use of an active clamp to tighten the setting screw is carried out with a play-free clamp, as it consists of a monolithic clamp, with operation in the elastic zone of the material, which ensures the precision of the setting value; a clamp as illustrated is capable of a gripping force of 40 N, in practice, 20 N is sufficient to handle a setting screw safely without risking breaking it;

there is no limitation of the correction value, and it is possible to perform several screwing and unscrewing cycles of the setting screw without loss of precision;

the digital control system of the setting screw setting process ensures the precision of the setting value, with a specific cycle to make up for the play, and a setting flexibility, since it is possible to select the setting screw(s) to be corrected;

the setting is performed in one go, and makes it possible to attain values of the order of +/−1 second per day regardless of the calibre;

the detection of the position of the setting screws is automatic, and enables the setting in one go of the two or four setting screws in usual cases;

no stress is exerted on the movement, thanks to the digital axes and the automatic process for detecting the centre of the balance, the position along Z of the balance, and the position of the setting screws;

no manual tool is used, which ensures the lack of deterioration or damage of a component of the watch;

no stress on the balance during the setting thanks to the bearing finger;

the fully digital process avoids any need for comparison with a standard balance;

the machine is compatible with all calibres, even the smallest, as the clamp allows operations that are impossible to carry out properly in complete safety with tweezers, a key, or a special setting tool.

The workstation equipped with such a highly compact setting machine is easy to use, with excellent ergonomics. Indeed, the limited dimensions of the setting machine 1000 facilitate the combination thereof with a conventional watchmaker's bench 4000, wherein the setting machine 1000 only occupies about half of the length.

The invention claimed is:

1. A horological setting machine for making at least one setting or adjustment on at least one horological assembly attached to a receptacle, said setting machine including control means, for coordinating in an automated manner the movements or operation of at least one positioning module, which includes handling means arranged to spatially move said receptacle on command from said control means to convey said receptacle into a setting or adjustment position relative to a frame included in said setting machine, below at least one acquisition module, which includes measuring or testing means arranged to identify and determine the spatial position of said receptacle, or said at least one horological assembly attached to said receptacle, relative to said frame and to communicate to said control means the information for the control or correction of position of said positioning module, said setting machine including at least one setting or adjustment module including setting or adjustment means arranged to make a setting or an adjustment on at least one said assembly borne by said receptacle, or on at least one component or a mobile component included in said assembly, on command from said control means, wherein said setting machine includes at least one said setting or adjustment module, said setting or adjustment means whereof include a plurality of motorised axes which are arranged to move, open and close, in a clamp plane perpendicular to a clamp rotation direction, a clamp which is arranged to drive or deform a mobile component or a component included in said assembly borne by said receptacle.

2. The setting machine according to claim 1, wherein said setting or adjustment module includes a clamp-holder body arranged to bear a said clamp and which can rotate about a clamp rotation axis along a rotary clamp axis, relative to a clamp carriage which can move along a vertical direction parallel with the vertical of the location relative to a structure which is, either attached to the frame, or free to move along a horizontal direction perpendicular to the vertical of the location, or along the vertical direction parallel with the vertical of the location, relative to a clamp base attached to said frame.

3. The setting machine according to claim 1, wherein said setting or adjustment module includes a clamp control body including a spindle which is arranged to exert a force on a surface of said clamp and deform said clamp in an opening or closing movement, said clamp control body being free to rotate, along a rotary clamp opening/closing control axis, either about a clamp rotation axis, or about a spindle axis parallel with the clamp rotation axis, relative to a clamp carriage which can move along a vertical direction parallel with the vertical of the location relative to a structure which is, either attached to said frame, or free to move along a horizontal direction perpendicular to the vertical of the location relative to a clamp base attached to said frame.

4. The setting machine according to claim 2, wherein said setting or adjustment module includes a clamp control body including a spindle which is arranged to exert a force on a surface of said clamp and deform said clamp in an opening or closing movement, said clamp control body being free to rotate, along a rotary clamp opening/closing control axis, either about the clamp rotation axis, or about a spindle axis parallel with the clamp rotation axis, relative to the clamp carriage which can move along the vertical direction parallel with the vertical of the location relative to the structure which is, either attached to said frame, or free to move along the horizontal direction perpendicular to the vertical of the location relative to the clamp base attached to said frame, and wherein said clamp control body is arranged to move said spindle over 360° for the opening or closing control of said clamp.

5. The setting machine according to claim 2, said setting or adjustment module includes a clamp control body including a spindle which is arranged to exert a force on a surface of said clamp and deform said clamp in an opening or closing movement, said clamp control body being free to rotate, along a rotary clamp opening/closing control axis, either about the clamp rotation axis, or about a spindle axis parallel with the clamp rotation axis, relative to the clamp carriage which can move along the vertical direction parallel with the vertical of the location relative to a structure which is, either attached to said frame, or free to move along the horizontal direction perpendicular to the vertical of the location relative to the clamp base attached to said frame, and wherein said clamp control body can rotate about said clamp rotation axis, so as to be able, in certain angular positions, to exert offset pressure relative to a plane of symmetry included in said clamp.

6. The setting machine according to claim 1, wherein said setting machine includes at least one drive module including drive means arranged to drive the component or the mobile component included in said assembly borne by said receptacle, on command from said control means.

7. The setting machine according to claim 6, wherein said at least one drive module includes a body which can move at least along a vertical direction parallel with the vertical of the location, and relative to which a rotary motorised driver can move in an articulated fashion about a driver axis parallel with the vertical direction.

8. The setting machine according to claim 7, wherein said body includes positioning means which are arranged to position in rotation, about an axis parallel with said vertical direction, at least one return arm relative to which is pivotally mounted, about an intermediate axis parallel with said driver axis, a driver arm bearing said driver, and wherein said body bears drive means for rotating said driver via belt, chain, gear, or cardan joint transmission means.

9. The setting machine according to claim 8, wherein said positioning means are arranged to angularly position the at least one return arm, to which the return arm is connected which is said driver arm or to which said driver arm is connected.

10. The setting machine according to claim 7, wherein said body is borne by a cross movement table in a vertical plane through the vertical of the location, including a carriage borne by another carriage which can move relative to a table base attached to said frame.

11. The setting machine according to claim 1, wherein said setting machine includes at least one holding or bearing module including holding or bearing means, which are arranged to exert a substantially axial pressure on the mobile component or the component of said assembly during or after a setting or an adjustment made on said assembly by said setting or adjustment module, or to keep said mobile component or the component contact-free by the action of a magnetic or electrostatic field, along a direction parallel with the vertical of the location, or along a direction forming an angle of less than 10° with said vertical direction of the location.

12. The setting machine according to claim 11, wherein said at least one holding or bearing module is borne by said at least one positioning module.

13. The setting machine according to claim 11, wherein said at least one holding or bearing module includes a rotary body relative to a vertical direction parallel with the vertical of the location and which drives a carrier arm which bears, in a fixed or articulated manner, the holding for bearing means.

14. The setting machine according to claim 13, wherein said holding or bearing means include a mass held by elastic guidance means attached to said carrier arm and arranged to keep said mass bearing on said mobile component or the component by applying a substantially vertical force.

15. The setting machine according to claim 6, wherein said setting machine includes at least one holding or bearing module including holding or bearing means, which are arranged to exert a substantially axial pressure on the mobile component or the component of said assembly during or after a setting or an adjustment made on said assembly by said setting or adjustment module, or to keep said mobile component or the component contact-free by the action of a magnetic or electrostatic field, along a direction (DE) parallel with the vertical of the location, or along a direction forming an angle of less than 10° with said vertical direction of the location, and wherein said holding or bearing module (500) is arranged to hold in a substantially axial position, along said vertical direction or along the direction forming the angle less than 10° with said vertical direction, said mobile component or the component of said assembly during or after the driving of said mobile component or the component by said drive means of the at least one drive module.

16. The setting machine according to claim 1, wherein said setting machine includes a frequency analyser or a chronometric testing apparatus coupled with said control means, which are programmed to trigger a setting iteration on a setting organ until entry into a required frequency or rate tolerance.

17. A method for using the setting machine according to claim 1, for setting or adjusting at least one horological component, wherein at least said receptacle is equipped with at least one said assembly which is a horological movement or a watch of an axial direction, wherein said axial direction is aligned with the vertical of the location, and wherein the mobile component or the component is set to be adjusted, wherein said acquisition module, said setting or adjustment module are cleared to the end of travel, so as to clear a work zone for the measurement, said setting or adjustment, wherein said receptacle is loaded on said positioning module, and wherein the positioning module is conveyed into said work zone, wherein said acquisition module is conveyed above said positioning module, wherein a target setting value of at least one parameter is determined, wherein the value of said at least one parameter measured on said at least one assembly is sent to said control means, wherein a programming cycle of said acquisition module is selected to measure at least the position of the top surface of said mobile component or the component along said vertical direction of the location, and wherein said position and any measurement made according to said programming cycle is sent to said control means which generate, according to said programming cycle selected, positioning movements of said positioning module to place said assembly in a set position, or movement and operating orders to said setting or adjustment or to at least one setting module according to a programmed sequence at said work zone.

18. The method according to claim 17, wherein said setting machine according to claim 11 is used, and said setting machine is equipped with at least one said holding or bearing module arranged to exert pressure on said mobile component or the component of said assembly during or after the setting or adjustment made on said assembly by said setting or adjustment module or said holding or bearing module or the at least another said setting module, or to keep said mobile component or the component contact-free by the action of the magnetic or electrostatic field, along the vertical direction parallel with the vertical of the location.

19. The method according to claim 17, wherein said setting machine according to claim 6 is used, and said setting machine is equipped with the at least one drive module, which includes a rotary motorised driver about a driver axis parallel with said vertical direction for driving said mobile component or the component.

20. The method according to claim 17, wherein said setting machine according to claim 1 is used, and said at least one setting or adjustment module is equipped with said clamp to drive or deform said mobile component or the component, and wherein said parameter is set by actuating said clamp on the at least one mobile component or the component of said assembly.

21. The method according to claim 17, wherein said setting machine is used for setting a setting screw which is a balance inertia-block or a balance bridge setting screw or a balance-spring stud setting screw, or a division setting screw, or an alignment setting screw, or for setting an index.

22. The method according to claim 17, wherein said setting machine is used for the local deformation of a bridge or a balance-spring or an arm or a felloe of a balance.

* * * * *